US009542637B2

(12) United States Patent
Raven et al.

(10) Patent No.: US 9,542,637 B2
(45) Date of Patent: Jan. 10, 2017

(54) RFID TAG WITH ANTI-TAMPER ASSEMBLY

(71) Applicant: INTERMEC, INC., Lynnwood, WA (US)

(72) Inventors: Gregory A. Raven, Granite Falls, WA (US); Jason Harrigan, Sultan, WA (US); Rene Martinez, Seattle, WA (US); Pavel Nikitin, Seattle, WA (US); Shashidhar Ramamurthy, Seattle, WA (US); David William Gilpin, Everett, WA (US); Stephen Kelly, Marion, IA (US)

(73) Assignee: INTERMEC, INC., Lynnwood, WA (US)

( * ) Notice: Subject to any disclaimer, the term of this patent is extended or adjusted under 35 U.S.C. 154(b) by 0 days.

(21) Appl. No.: 14/956,763

(22) Filed: Dec. 2, 2015

(65) Prior Publication Data

US 2016/0189022 A1   Jun. 30, 2016

Related U.S. Application Data

(60) Provisional application No. 62/099,104, filed on Dec. 31, 2014.

(51) Int. Cl.
*G06K 19/077*   (2006.01)
*G06K 19/073*   (2006.01)

(52) U.S. Cl.
CPC ... *G06K 19/07773* (2013.01); *G06K 19/07381* (2013.01); *G06K 19/07749* (2013.01)

(58) Field of Classification Search
CPC .............. G06K 19/073; G06K 19/0739; G06K 19/07749; G06K 19/07771

(Continued)

(56) References Cited

U.S. PATENT DOCUMENTS 7,095,324 B2 *  8/2006  Conwell .............. G06K 19/073
                                                    235/488
7,450,011 B2 * 11/2008  Duschek ............ G08B 13/2434
                                                    340/572.1

(Continued)

FOREIGN PATENT DOCUMENTS

EP           1 132 859 A2     9/2001

OTHER PUBLICATIONS

May 6, 2016 Search Report issued in European Patent Application No. 15200979.1.

*Primary Examiner* — Seung Lee
(74) *Attorney, Agent, or Firm* — Oliff PLC; R. Brian Drozd

(57) ABSTRACT

A radio frequency identification (RFID) transponder may include a substrate and a device. The substrate may be in communication with a controller and an antenna, and the antenna is arranged to receive radio frequency signals. A first side surface of the substrate may include a capacitor. The device may be detachably coupled with the substrate via a conductive member positioned between the structure and the capacitor of the substrate, and the conductive member may be within a desired proximity of the capacitor. The structure may be attached to an attachment surface so that an attachment strength between the structure and the attachment surface may be greater than a force required to decouple the structure from the substrate. When the structure is decoupled from the substrate, the conductive member separates from the capacitor, disabling the transponder.

21 Claims, 3 Drawing Sheets

(58) Field of Classification Search
USPC .................................... 235/380, 487, 492
See application file for complete search history.

(56) References Cited

U.S. PATENT DOCUMENTS

| | | | | |
|---|---|---|---|---|
| 7,946,499 | B2* | 5/2011 | Jansen | G06K 19/07345 |
| | | | | 235/492 |
| 7,969,309 | B2* | 6/2011 | Abe | B65C 1/042 |
| | | | | 340/572.1 |
| 2004/0104274 | A1 | 6/2004 | Kotik et al. | |
| 2007/0125867 | A1 | 6/2007 | Oberle | |
| 2011/0285507 | A1* | 11/2011 | Nelson | G06K 19/07749 |
| | | | | 340/10.1 |

* cited by examiner

RFID TAG WITH ANTI-TAMPER ASSEMBLY

CROSS-REFERENCE TO RELATED APPLICATION

This nonprovisional application claims the benefit of U.S. Provisional Application No. 62/099,104, filed Dec. 31, 2014. The disclosure of the prior application is hereby incorporated by reference herein in its entirety.

TECHNICAL FIELD

The present disclosure relates to a radio frequency identification (RFID) tag and, more specifically, to a battery-assisted power (BAP) RFID tag with an anti-tamper assembly.

BACKGROUND

Vehicles can be automatically monitored with an electronic vehicle identification system, which is done with a wireless interface between a vehicle and a monitoring device. An electronic vehicle identification system is based on a RFID transponder, or tag, that is attached to a vehicle and a reader with an antenna for interrogating with the vehicle.

A RFID transponder is used for providing remotely controllable identity information of the vehicle. With the user configurable memory in the RFID transponder, the information can be written and read remotely. A RFID transponder is commonly classified, in terms of the use they make of an internal power source, as: a passive RFID transponder which has no internal power source and uses the energy of the RF radiation transmitted by the reader; an active RFID transponder which comprises an internal power source that is used for both powering the transponder and for generating the RF energy required for transmitting a response radiation; and a battery-assisted RFID transponder (also referred to as a semi-active or a semi-passive transponder) which comprises an internal power source, where the energy of the response radiation is derived from the interrogation radiation provided by the reader and the transponder circuitry is powered by the internal power source.

A battery-assisted passive (BAP) transponder has a small battery on board and is activated when in the presence of an RFID reader. The battery to powers the transponder's return reporting signal. Of course, a passive tag is cheaper and smaller because it has no battery; instead, the tag uses the radio energy transmitted by the reader. However, to operate a passive tag, it must be illuminated with a power level roughly a thousand times stronger than for signal transmission. That makes a difference in interference and in exposure to radiation.

In the passive RFID transponder, the limitation is a reading distance while the RFID transponder needs to receive its operating power from a reader. In the active RFID transponder, the RFID transponder has a transmitter which requires more complex electronics for the functionality thus resulting in high cost and consumption of power compared to the battery-assisted RFID transponder and the passive RFID transponder. The energy required for battery-assisted RFID transponder and the passive RFID transponder to function is considerably less than for the active RFID transponder.

In some applications, an RFID transponder is associated with a single vehicle. For example, a transponder attached to a vehicle has a code that identifies the vehicle and other data associated with the vehicle, such as the registered owner, the license plate number, and/or any other information about the vehicle. Users sometime attempt to remove the transponder from the vehicle and attach it to a different vehicle, despite such transfer being prohibited by the organization issuing the transponder. As such, some transponders may be provided with a mechanism whereby the transponder cannot be removed from the vehicle without permanently and irreparably destroying the transponder. This destruction creates undesired costs and inefficiency. It may be desirable to provide an RFID transponder with a tamper-proof assembly that temporarily disables the transponder if a user attempts to remove the transponder from the vehicle with which it is associated.

SUMMARY

To address the above issues, a tamper-proof RFID transponder is provided. The transponder is attached to an attachment surface of, for example, a vehicle. The transponder includes a break-away structure that is detachably coupled with a housing of the transponder. If someone attempts to remove the transponder from the attachment surface, the break-away structure remains with the attachment surface and becomes decoupled from the housing. When the break-away structure is decoupled, a conductive foam member separates from a capacitor on a substrate contained in the housing, thereby creating a capacitance change of the capacitor. When the capacitance change exceeds a predetermined threshold, a microcontroller provided on the substrate is scrambled, thereby disabling the transponder. The microcontroller remains scrambled until reprogrammed, thus providing evidence of tampering but also permitting re-enablement of the transponder.

In one embodiment, an RFID transponder includes a housing and a substrate contained in the housing. A microcontroller and an antenna are arranged on the substrate. The microcontroller communicates with an RFID unit, and the antenna receives and backscatters radio frequency interrogation radiation. A first side surface of the substrate includes a capacitor. A break-away structure is detachably coupled with the housing, and a conductive foam member is sandwiched between the break-away structure and the capacitor of the substrate. The conductive foam member is within a desired proximity of the capacitor. An adhesive member is configured to attach the break-away structure to an attachment surface. An attachment strength of the adhesive member with the break-away structure and the attachment surface is greater than a force required to decouple the break-away structure from the housing. When the break-away structure is decoupled from the housing, the conductive foam member separates from the capacitor and the transponder is disabled.

In another embodiment, a radio frequency identification (RFID) transponder comprises a substrate and a break-away device. The substrate is in communication with a controller and an antenna, and the antenna is arranged to receive radio frequency signals. A first side surface of the substrate includes a capacitor. The break-away device may be detachably coupled with the substrate via a conductive member positioned between the break-away structure and the capacitor of the substrate, and the conductive member may be within a desired proximity of the capacitor. The break-away structure is attached to an attachment surface so that an attachment strength between the break-away structure and the attachment surface is greater than a force required to decouple the break-away structure from the substrate. When the break-away structure is decoupled from the substrate, the conductive member separates from the capacitor and the transponder is disabled.

In another embodiment, a method of radio frequency identification (RFID) communications may include: providing a transponder comprising: a substrate, an antenna, and a break-away structure, wherein a first side surface of the substrate includes a capacitor; detachably coupling the break-away device with the substrate via a conductive member positioned between the break-away structure and the capacitor of the substrate, the break-away structure being attached to an attachment surface so that an attachment strength between the break-away structure and the attachment surface is greater than a force required to decouple the break-away structure from the substrate; decoupling the break-away structure from the substrate so that the conductive foam member moves away from the capacitor; and disabling the transponder is disabled in response to the decoupling the break-away structure from the substrate.

BRIEF DESCRIPTION OF THE DRAWINGS

The objects and features of the disclosure can be better understood with reference to the drawings described below, and the claims. The drawings are not necessarily to scale, emphasis instead generally being placed upon illustrating the principles of embodiments of the disclosure. In the drawings, like numerals are used to indicate like parts throughout the various views.

DETAILED DESCRIPTION OF THE EMBODIMENTS

Various examples of the disclosure will now be described. The following description provides specific details for a thorough understanding and enabling description of these examples. One skilled in the art will understand, however, that the disclosure may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the disclosure. Certain terms may even be emphasized below; however, any terminology intended to be interpreted in any restricted manner will be overtly and specifically defined as such in this Detailed Description section.

Examples according to the disclosure may find ready applications in a setting where RFID tags are placed on vehicles. These applications may include, for example, paying tolls, parking, purchasing gas, and any other application. It should be understood that, while examples of the present disclosure are discussed herein with regard to a vehicle, the present disclosure may not be so limited and could be applied to various other applications.

Figure 1:
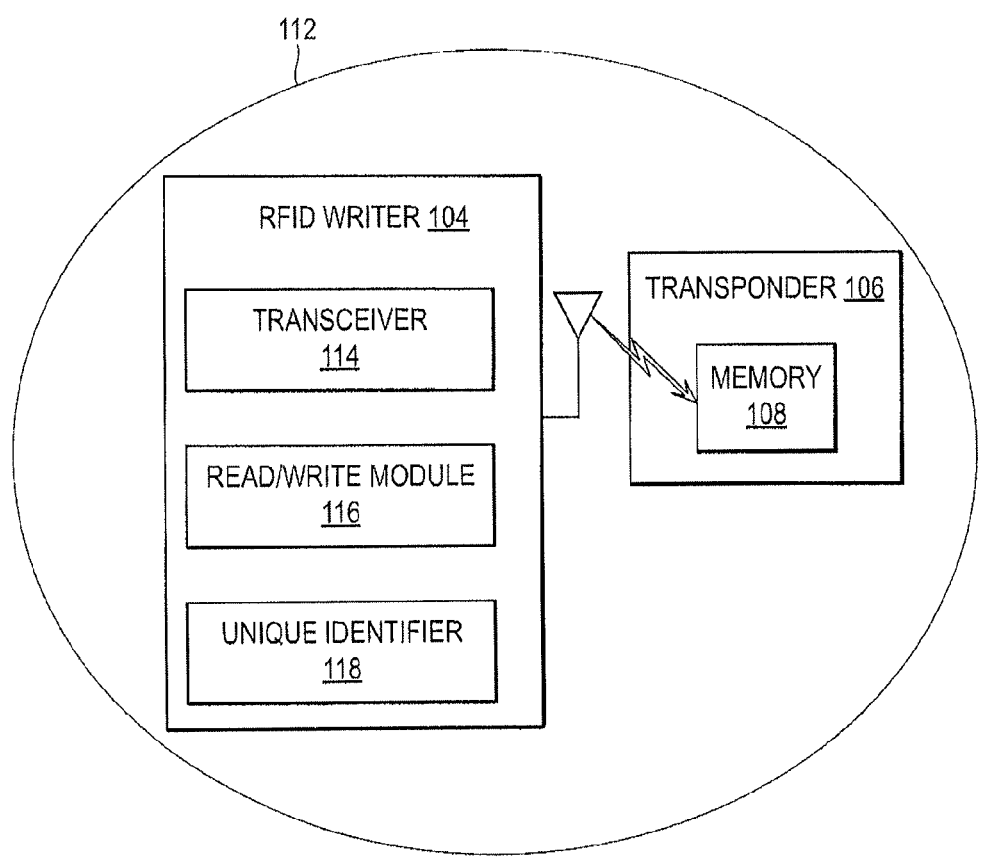
FIG. 1 illustrates an RFID system in accordance with the disclosure.

FIG. 1 illustrates an RFID system 100 including an RFID unit 104 and an RFID transponder 106. The RFID unit 104 is configured to read from and/or write to transponders 106 within the range 112 of the RFID unit 104. According to one embodiment, the RFID unit 104 includes a transceiver 114, a read/write module 116, a unique identifier 118 stored in memory, and an antenna. The RFID transponder 106 includes memory 108 where a code associated with the RFID transponder 106 is stored. The code of the RFID transponder 106 identifies the item it is attached thereto. For example, a transponder attached to a vehicle has a code that identifies the vehicle and other data associated with the vehicle, such as the registered owner, the license plate number, and/or any other information about the vehicle. The transponder code is capable of being modified to add or change the data therein. In one embodiment, a unique identifier may be added as a prefix to the code of the transponder by the RFID unit 104. In another embodiment, the unique identifier does not modify the code but instead is saved as an additional code in the transponder. Regardless, when an RFID unit 104 queries the RFID transponder 106, the RFID transponder 106 may transmit back to the RFID unit 104 both the code and the unique identifier.

The antenna of the RFID unit 104 is designed to transmit a signal to a transponder which instructs the transponder to write the unique identifier to the transponder, such as a prefix to the previously-stored code. The transponders may be "passive" RFID tags, "active" RFID tags, or "battery assisted passive" (BAP) tags. Passive RFID tags are a type of transponder that does not contain their own power source or transmitter. When radio waves from the RFID writer reach the transponder's antenna, the energy is converted by the transponder's antenna into electricity that can power up the microcontroller in the tag (typically via inductive coupling). The passive RFID tag is then able to receive and store the unique identifier to memory at the RFID tag by modulating the RFID reader's electromagnetic waves. "Active" RFID tags have their own power source and transmitter. The power source, usually a battery, is used to run the microcontroller's circuitry and to broadcast a signal to an RFID reader. Passive RFID tags do not have as great a range as active RFID tags, but it should be understood that either type of transponder may be employed in the present application.

When the RFID transponder 106 is within the range 112 of the RFID unit 104, the RFID unit 104 may receive a code stored in the memory 108 associated with the RFID transponder 106 is stored. It should be understood that the RFID unit 104 may be a RFID reader/writer that is configured to read from and write to transponders.

Figure 2:
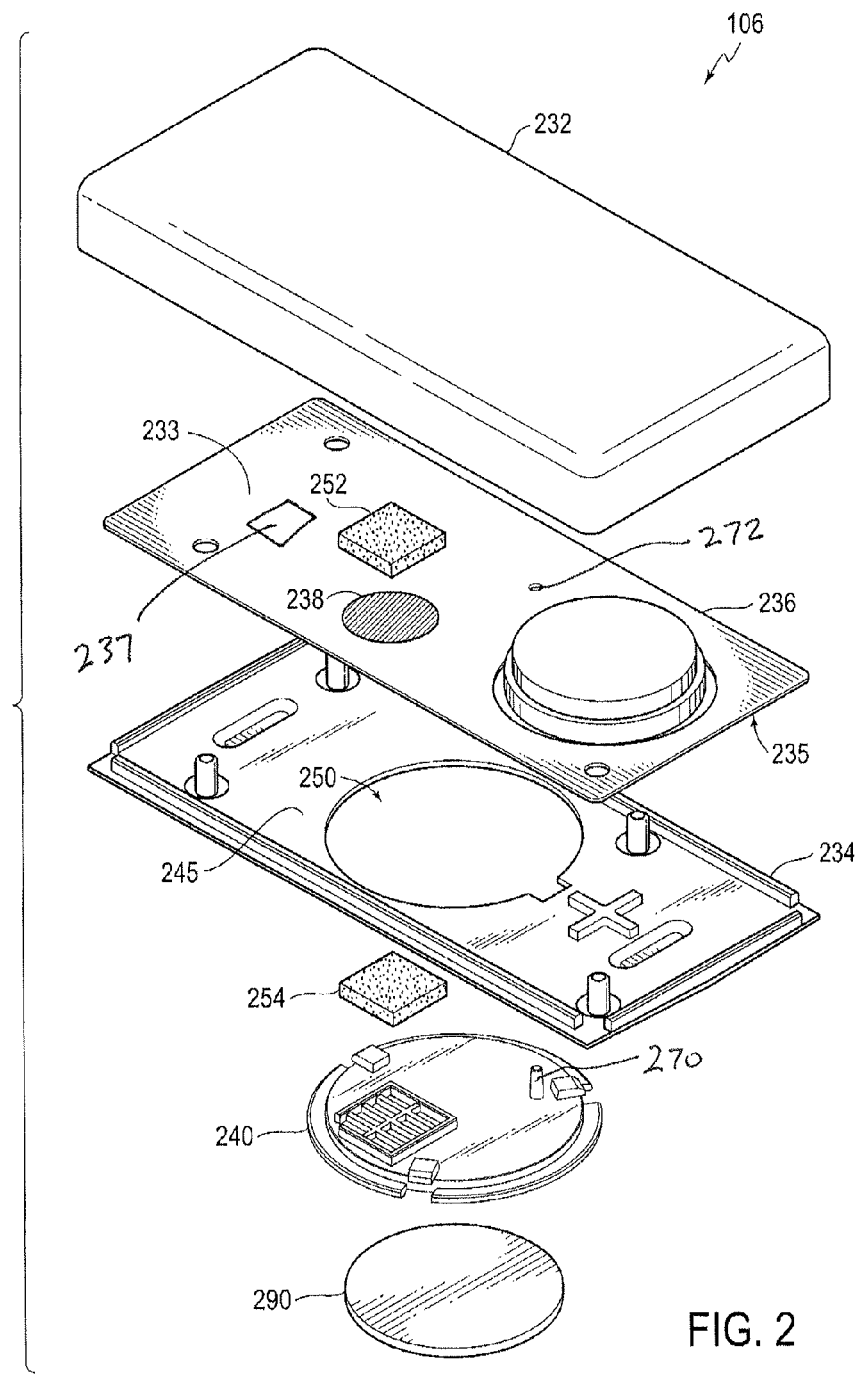
FIG. 2 is an exploded view of an example of an RFID transponder having an anti-tamper assembly in accordance with the disclosure.

Referring now to FIG. 2, the RFID transponder 106 may be, for example, a BAP RFID transponder. The transponder 106 may include a housing 230 (FIG. 4) having a top portion 232 and a bottom portion 234. According to various aspects, the top and bottom portions 232, 234 of the housing 230 can be constructed of rigid, non-flexible parts that create an enclosure around the RFID transponder. For example, the housing 230 can be constructed from plastics or fiberglass materials, but can also be constructed of any material suitable for encapsulating resonant components at ultra-high frequencies.

The housing 230 contains a printed circuit board 236. The printed circuit board 236 may be a substrate, which for example is rigid or flexible and on which a microcontroller 237, a battery, and an antenna are constructed. In some aspects, the printed circuit board 236 can be replaced with a PET plastic film with an adhered conductive metal layer. It should be understood that the substrate may include a microcontroller 237, which has both an analogue part for modifying the impedance matching of an antenna circuitry and a digital part for holding the logical functions and memory which enable RFID functionalities according to the air-interface standards that are used in the RFID transponder 106. The substrate may also include a battery, for example, a 3 volt battery, attached to the microcontroller 237 by means of conductive path, such as a conductive wire between the battery and the microcontroller 237, conductive glue, or mechanical bond between the microcontroller 237 and the battery. The battery may be, for example, a thin-film battery with thickness less to 1 millimeter. The printed circuit board 236 may include an antenna arranged to receive/backscatter radio frequency interrogation radiation from/to the RFID unit 104.

As shown in FIG. 2, the printed circuit board 236 includes a capacitive member, or capacitor, 238 implemented on the printed circuit board 236. The microcontroller 237 is programmed to periodically probe the capacitor 238 to measure the capacitance and determine whether the capacitance of the capacitor 238 has changed. If the microcontroller 237 determines that the capacitor 238 experiences a change of capacitance that exceeds a predetermined threshold, the microcontroller 237 disables the transponder 106.

Figure 3:
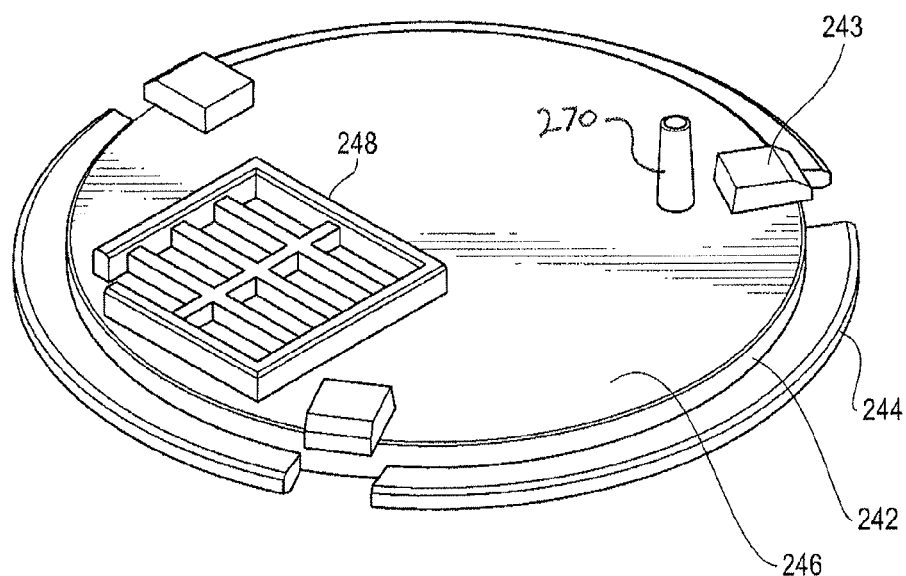
FIG. 3 is an enlarged view of the break-away structure of FIG. 2.

The transponder 106 includes a break-away structure 240 coupleable with the bottom portion 234 of the housing 230. For example, as shown in FIG. 3, the break-away structure 240 may have a raised center region 242 and a peripheral flange 244. The raised center portion 242 is sized and arranged to be received by the cutout region 250 of the bottom portion 234 of the housing 230. The center portion 242 may include a plurality of tabs 243 spaced about its periphery. The tabs 243 may extend outward of the periphery of the center portion 242.

When the top and bottom portions 232, 234 of the housing 230 are assembled to contain the printed circuit board 236, the raised centered portion 242 of the break-away structure 240 slightly enters the cutout region 250 such that the tabs 243 extending from the surface of the cutout region 250 can engage an inner surface 245 of the bottom portion 234 of the housing 230 thus removably coupling the break-away structure 240 to the housing 230. When the break-away structure 240 is coupled with the housing 230, a surface 246 of the raised center portion 242 faces the printed circuit board 236 within the housing 230, while the peripheral flange 244 remains outside the bottom portion 232 of the housing 230. As illustrated in FIG. 3, the surface 246 of the raised center portion 242 includes a raised platform 248.

Figure 4:
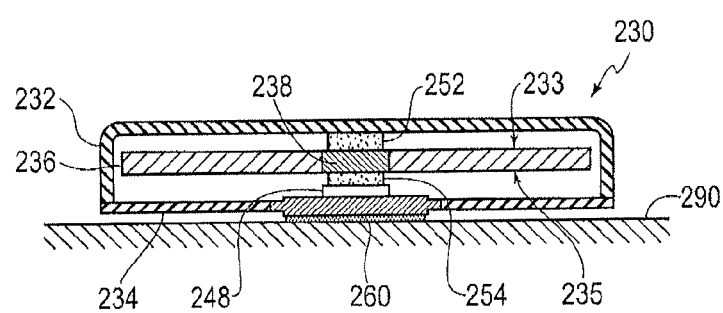
FIG. 4 is a cross-sectional view of the RFID transponder of FIG. 2.

Referring again to FIG. 2, the transponder 106 includes a first conductive foam member 252 and a second conductive foam member 254. As illustrated in FIG. 4, when the break-away structure 240 is coupled with the bottom portion 234 of the housing 230, the first conductive foam member 252 is positioned between the top portion 232 of the housing 230 and the capacitor 238 on a first side 233 of the printed circuit board 236 facing the top portion 232 of the housing 230. The second conductive foam member 254 is positioned between the raised platform 248 and the capacitor 238 on a second side 235 of the printed circuit board 236 facing the bottom portion 234 of the housing 230.

As discussed above, the capacitor 238 is electrically incorporated into the printed circuit board 236 such that the microcontroller 237 can enable and disable the printed circuit board 236, and thus the transponder 106, depending on the capacitance of the capacitor 238. For example, when the first and second conductive foam members 252, 254 are within a desired distance relative to the capacitor 238 on the first and second sides of the printed circuit board 236, the capacitance of the capacitor 238 remains substantially unchanged. The microcontroller 237 thus determines that the capacitor 238 has not experienced a capacitance change that exceeds the predetermined threshold. As a result, the printed circuit board 236 is enabled and the transponder 106 is operable. However, when either one or both of the first and second conductive foam members 252, 254 are moved beyond the desired distance relative to the capacitor 238 on the first and/or second side of the printed circuit board 236, the capacitance of the capacitor 238 changes. If the microcontroller 237 then determines that the capacitor 238 has experienced a capacitance change that exceeds the predetermined threshold, the microcontroller 237 disables the printed circuit board 236 and the transponder 106 is inoperable. It should be understood that the printed circuit board 236 may be "scrambled" when either one or both of the first and second conductive foam members 252, 254 is moved a sufficient distance away from the capacitor 238 such that a capacitance change exceeds the predetermined threshold. The printed circuit board 236 may remain scrambled until it is reprogrammed. Thus, even if both the first and second conductive foam members 252, 254 are returned to a position closer to the capacitor 238 (or to their original positions), the printed circuit board 236 is not re-enabled and the transponder 106 remains inoperable. In one embodiment, to disable the transponder, power may be removed from the transponder or one or more other components from the transponder may be disconnected. In this regard, the transponder would effectively be disabled.

The RFID transponder 106 includes an adhesive member 260 for coupling the transponder 106 to an attachment surface 290. The attachment surface 290 may be, for example, a windshield, dashboard, or other surface of a vehicle. In some aspects, the adhesive member 260 may be a double-sided tape such as, for example, very high bond (VHB) or ultra high bond (UHB) double-sided tape. The bonding strength of the adhesive member 260 should be selected to provide a substantially permanent connection between the transponder 106 and the attachment surface 290. As shown in FIGS. 1 and 4, the adhesive member 260 may be sized and arranged to couple the break-away structure 240 of the transponder with the attachment surface 290. The bonding strength of the adhesive member 260 should be sufficient to keep the break-away structure 240 coupled with the attachment surface 290 even when a force is applied to the housing 230 of the transponder that causes the bottom portion 234 of the housing 230 to become decoupled from the break-away structure 240. Thus, if a force is applied to the transponder 106 in an attempt to remove the transponder 106 from the attachment surface 290, the force will cause the bottom portion 234 of the housing 230 to become decoupled from the break-away structure 240 while the adhesive member 260 will maintain attachment between the break-away structure 240 and the attachment surface 290. When the bottom portion 234 of the housing 230 is decoupled from the break-away structure 240, the second conductive foam member 254 moves away from the capacitor 238 on the second side of the printed circuit board 236 that faces the bottom portion 234 of the housing 230. The movement of the second conductive foam member 254 away from the capacitor 238 on the second side of the printed circuit board 236 will result in a capacitance change that exceeds the predetermined threshold, and the printed circuit board 236 is disabled and the transponder 106 is inoperable. The printed circuit board 236 may also be "scrambled" when the capacitance change exceeds the predetermined threshold. The printed circuit board 236 may remain scrambled until it is reprogrammed.

In some aspects, the break-away structure 240 may be configured as a circular shape, and the second conductive foam member 254 may be positioned off-center on the break-away structure 240 such that the break-away structure 240 must be correctly rotationally aligned relative to the printed circuit board 236 in order to sandwich the second conductive foam member 254 between the raised platform 248 and the capacitor 238 on the second side of the printed circuit board 236 facing the bottom portion 234 of the housing 230. This break-away structure 240 and the bottom portion 234 of the housing 230 may be provided with alignment markers, as would be understood by persons skilled in the art, in order to ensure proper alignment. The rotational alignment provides another mechanism for preventing tampering with the transponder 106. For example, if housing 230 is rotated relative to the break-away structure 240, which is fixedly attached to the attachment surface 290, the second conductive foam member 254 may be moved a distance away from the capacitor 238 on the second side of the printed circuit board 236 causing a capacitance change that exceeds the predetermined threshold, and the printed circuit board 236 is disabled and the transponder 106 is inoperable. The printed circuit board 236 may also be "scrambled" when the capacitance change exceeds the predetermined threshold. The printed circuit board 236 may remain scrambled until it is reprogrammed.

According to some aspects, the break-away structure 24 may include a tamper tab 270. When the top and bottom portions 232, 234 of the housing 230 are assembled, the tamper tab 270 extends through the opening 250 in the bottom portion 234 and cooperates with a corresponding through hole 272 in the printed circuit board 236. Thus, if someone tries to twist the transponder 106 in an attempt to remove the transponder 106 from the attachment surface 290, the tamper tab 270 breaks and the top and bottom portions 232, 234 of the housing 230 separate. As a result, one or both of the conductive foam members 242, 254 move away from the capacitor 238, thereby creating a capacitive change that exceeds the predetermined threshold. The printed circuit board 236 is then disabled and the transponder 106 is inoperable. The printed circuit board 236 may also be "scrambled" when the capacitance change exceeds the predetermined threshold. The printed circuit board 236 may remain scrambled until it is reprogrammed.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the disclosure to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the disclosure can be practiced in many ways. Details of the system may vary considerably in its implementation details, while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Accordingly, the inventors reserve the right to add additional claims after filing the application to pursue such additional claim forms for other aspects of the disclosure.

What is claimed is:

1. A radio frequency identification (RFID) transponder, comprising:
 a substrate disposed with a housing;
 a capacitor coupled with the substrate;
 an antenna being arranged to receive a radio frequency interrogation signal;

a structure configured to be detachably coupled with the housing; and a conductor positioned between the structure and the capacitor;

wherein an adhesive member is configured to be coupled between the structure and an attachment surface of an object, and wherein, in response to the structure being decoupled from the housing, the adhesive member causes the conductor to separate from the capacitor, which disables the transponder.

2. The RFID transponder of claim 1, wherein a capacitance is measured when the conductor separates from the capacitor.

3. The RFID transponder of claim 2, wherein a determination is made as to whether the capacitance change exceeds a predetermined threshold.

4. The RFID transponder of claim 3, wherein the transponder is disabled when the capacitance change is determined to have exceeded the predetermined threshold.

5. The RFID transponder of claim 1, wherein to disable the transponder, a controller of the RFID transponder is scrambled so that the transponder is scrambled until the controller is reprogrammed.

6. The RFID transponder of claim 1, wherein to disable the transponder, the transponder is disconnected from a power source.

7. The RFID transponder of claim 1, wherein an attachment strength of the adhesive member between the structure and the attachment surface is greater than a force required to decouple the structure from the housing.

8. The RFID transponder of claim 7, wherein the microcontroller is disposed on the substrate and wherein the antenna is disposed on the substrate.

9. The RFID transponder of claim 1, further comprising a microcontroller that detects when the conductor separates from the capacitor and, in response to detecting the conductor moving away from the capacitor, disables the RFID transponder.

10. The RFID transponder of claim 1, wherein the conductor comprises a conductive foam structure.

11. The RFID transponder of claim 1, wherein the capacitor is coupled to a side surface of the substrate.

12. A radio frequency identification (RFID) transponder comprising:

a substrate in communication with a controller and an antenna, the antenna being arranged to receive radio frequency signals, a first side surface of the substrate including a capacitor;

a device detachably coupled with the substrate via a conductive member positioned between the structure and the capacitor of the substrate, the conductive member being within a desired proximity of the capacitor; and wherein the structure is attached to an attachment surface so that an attachment strength between the structure and the attachment surface is greater than a force required to decouple the structure from the substrate, wherein, when the structure is decoupled from the substrate, the conductive member separates from the capacitor, disabling the transponder.

13. The RFID transponder of claim 12, wherein a capacitance change is measured when the conductive foam member separates from the capacitor.

14. The RFID transponder of claim 13, wherein a determination is made as to whether the capacitance change exceeds a predetermined threshold.

15. The RFID transponder of claim 14, wherein the transponder is disabled when the capacitance change exceeds a predetermined threshold.

16. The RFID transponder of claim 12, wherein when the transponder is disabled, a controller of the RFID transponder is scrambled, thereby disabling the transponder until the controller is reprogrammed.

17. A method of radio frequency identification (RFID) communications, the method comprising:

providing a transponder comprising: a substrate, an antenna, and a structure, wherein a first side surface of the substrate includes a capacitor, detachably coupling the device with the substrate via a conductive member positioned between the structure and the capacitor of the substrate, the structure being attached to an attachment surface so that an attachment strength between the structure and the attachment surface is greater than a force required to decouple the structure from the substrate; and decoupling the structure from the substrate so that the conductive foam member separates from the capacitor, thereby disabling the transponder.

18. The method of claim 17, further comprising measuring a capacitance change when the conductive foam member separates from the capacitor.

19. The method of claim 18, further comprising determining whether the capacitance change exceeds a predetermined threshold.

20. The method of claim 19, further comprising disabling the transponder when the capacitance change exceeds a predetermined threshold.

21. The method of claim 17, further comprising scrambling a controller of the RFID transponder when the transponder is disabled, thereby disabling the transponder until the controller is reprogrammed.

* * * * *